United States Patent
Mitsumoto

(10) Patent No.: US 11,066,098 B2
(45) Date of Patent: Jul. 20, 2021

(54) VEHICLE DISTURBANCE DETECTION APPARATUS

(71) Applicant: Toyota Jidosha Kabushiki Kaisha, Toyota (JP)

(72) Inventor: Hisanori Mitsumoto, Hadano (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 77 days.

(21) Appl. No.: 16/697,737

(22) Filed: Nov. 27, 2019

(65) Prior Publication Data

US 2020/0172164 A1    Jun. 4, 2020

(30) Foreign Application Priority Data

Nov. 30, 2018 (JP) .............................. JP2018-224540

(51) Int. Cl.
*B62D 6/04* (2006.01)
*B62D 15/02* (2006.01)
*B60W 30/02* (2012.01)

(52) U.S. Cl.
CPC ............. *B62D 6/04* (2013.01); *B62D 15/021* (2013.01)

(58) Field of Classification Search
CPC ........ B62D 15/025; B62D 15/02; B62D 6/04; B60W 30/02; B60W 40/10
See application file for complete search history.

(56) References Cited

U.S. PATENT DOCUMENTS

| 10,395,444 | B1* | 8/2019 | Edren | G07C 5/0808 |
| 2019/0111936 | A1* | 4/2019 | Fu | G06K 9/00798 |
| 2019/0152471 | A1* | 5/2019 | Mitsumoto | B60W 30/12 |
| 2019/0225260 | A1* | 7/2019 | Tsubaki | B62D 15/0235 |

FOREIGN PATENT DOCUMENTS

| JP | 2004-098796 A | 4/2004 |
| JP | 2015-093618 A | 5/2015 |
| JP | 2019-093765 A | 6/2019 |

* cited by examiner

*Primary Examiner* — Tan Q Nguyen
(74) *Attorney, Agent, or Firm* — Dinsmore & Shohl LLP

(57) ABSTRACT

A vehicle disturbance detection apparatus includes an electronic control unit. The electronic control unit determines whether a disturbance occurs in a vehicle based on detection signals from a sensor device. The disturbance is a lateral external force that causes the vehicle to veer in a direction different from a direction expected by a driver. The electronic control unit determines that the disturbance occurs in the vehicle when a disturbance determination condition is established in a relationship between a calculated yaw rate and an actual yaw rate. The disturbance determination condition includes a cant traveling exclusion condition that is not established when the vehicle veers by traveling along a cant road but is established when the vehicle veers by receiving a crosswind.

7 Claims, 4 Drawing Sheets

VEHICLE DISTURBANCE DETECTION APPARATUS

CROSS-REFERENCE TO RELATED APPLICATIONS

This application claims priority to Japanese Patent Application No. 2018-224540 filed on Nov. 30, 2018, which is incorporated herein by reference in its entirety including the specification, drawings and abstract.

BACKGROUND

1. Technical Field

The disclosure relates to a disturbance detection apparatus configured to detect a disturbance that is a lateral external force that causes a vehicle such as an automobile to veer in a direction different from a direction desired by a driver.

2. Description of Related Art

There is a known apparatus configured to detect a disturbance that is a lateral external force that causes a vehicle to veer in a direction different from a direction desired by a driver. For example, an apparatus described in Japanese Unexamined Patent Application Publication No. 2004-98796 (JP 2004-98796 A) includes an observer configured to calculate a lateral gradient disturbance estimation value, a lateral force disturbance estimation value, a lateral velocity estimation value, and a yaw rate estimation value from detection values from a steering angle sensor, a yaw rate sensor, a lateral acceleration sensor, and a vehicle speed sensor based on a steering-vehicle system model of a vehicle. Thus, this apparatus separately estimates a lateral gradient disturbance and a lateral force disturbance that is another lateral disturbance out of lateral disturbances that affect the vehicle.

The lateral force disturbance is a disturbance such as a crosswind that hinders a driver's steering operation, that is, a disturbance that causes the vehicle to veer undesirably. The lateral gradient disturbance is a disturbance to be detected when the vehicle is traveling along a cant road whose traveling road surface is inclined in a lateral direction. The lateral gradient disturbance does not hinder the driver's steering operation. Therefore, the apparatus described above separately estimates the lateral gradient disturbance and the lateral force disturbance, and corrects a steering assist torque to be generated in an electric power steering system so as to reduce the degree of the veer of the vehicle due to the lateral force disturbance.

SUMMARY

The apparatus of JP 2004-98796 A employs an observer configured such that a deviation between an estimated lateral acceleration and an actual lateral acceleration and a deviation between an estimated yaw rate and an actual yaw rate are multiplied by observer gains, respectively, thereby correcting a model variation (configuration for increasing the observer's estimation accuracy of the lateral force disturbance and the lateral gradient disturbance). The observer gains are adjusted by feedback. Therefore, it is difficult to estimate the disturbances with high accuracy when the actual yaw rate and the actual lateral acceleration detected by the sensors are not stable. As a result, it is difficult to estimate the lateral force disturbance early.

For example, if the lateral force disturbance can be detected early, it is possible to start vehicle behavior stabilization control early to suppress the veer of the vehicle. If the detection of the lateral force disturbance is delayed, however, the start of the vehicle behavior stabilization control is delayed accordingly. The lateral movement amount of the vehicle due to the lateral force disturbance increases by an amount corresponding to the delay.

The disclosure provides a vehicle disturbance detection apparatus in which a lateral disturbance that hinders a driver's steering operation can be detected early while distinguishing a case where a vehicle veers by traveling along a cant road and a case where the vehicle veers by receiving a crosswind.

One aspect of the disclosure relates to a vehicle disturbance detection apparatus including a sensor device and an electronic control unit. The sensor device includes a vehicle speed sensor configured to detect a vehicle speed, a steering angle sensor configured to detect a steering angle, a lateral acceleration sensor configured to detect a lateral acceleration of a vehicle, and a yaw rate sensor configured to detect a yaw rate of the vehicle. The electronic control unit is configured to execute determining whether a disturbance occurs in the vehicle based on detection signals from the sensor device. The disturbance is a lateral external force that causes the vehicle to veer in a direction different from a direction expected by a driver. The electronic control unit is configured to execute calculating a first standard yaw rate estimable by using pieces of information related to the vehicle speed, the steering angle, the lateral acceleration, and predetermined vehicle specifications. The electronic control unit is configured to execute calculating a second standard yaw rate estimable by using the pieces of information related to the vehicle speed, the steering angle, and the vehicle specifications without using the piece of information related to the lateral acceleration. The electronic control unit is configured to execute determining that the disturbance occurs in the vehicle when a disturbance determination condition is established in a relationship among the first standard yaw rate, the second standard yaw rate, and an actual yaw rate. The disturbance determination condition includes a cant traveling exclusion condition that is not established when the vehicle veers by traveling along a cant road but is established when the vehicle veers by receiving a crosswind. The actual yaw rate is the yaw rate detected by the yaw rate sensor.

The vehicle disturbance detection apparatus of the aspect described above includes the sensor device, and determines whether the disturbance that is the lateral external force that causes the vehicle to veer in a direction different from the direction expected by the driver occurs in the vehicle based on the detection signals from the sensor device. The sensor device includes at least the vehicle speed sensor configured to detect the vehicle speed, the steering angle sensor configured to detect the steering angle, the lateral acceleration sensor configured to detect the lateral acceleration of the vehicle, and the yaw rate sensor configured to detect the yaw rate of the vehicle.

The electronic control unit is configured to calculate the first standard yaw rate estimable by using the pieces of information related to the vehicle speed, the steering angle, the lateral acceleration, and the predetermined vehicle specifications in order to determine whether the disturbance occurs in the vehicle. That is, the electronic control unit is configured to calculate the first standard yaw rate that is the yaw rate of the vehicle based on the vehicle speed, the steering angle, the lateral acceleration, and the vehicle specifications.

The electronic control unit is configured to calculate the second standard yaw rate estimable by using the pieces of information related to the vehicle speed, the steering angle, and the vehicle specifications without using the piece of information related to the lateral acceleration. That is, the electronic control unit is configured to calculate the second standard yaw rate that is the yaw rate of the vehicle based on the vehicle speed, the steering angle, and the vehicle specifications.

The electronic control unit is configured to determine that the disturbance occurs in the vehicle when the disturbance determination condition that defines the relationship among the first standard yaw rate, the second standard yaw rate, and the actual yaw rate is established.

The disturbance determination condition need not be a single condition that defines the relationship among the three yaw rates (first standard yaw rate, second standard yaw rate, and actual yaw rate). For example, the disturbance determination condition may be constituted by a plurality of conditions that define a relationship between the first standard yaw rate and the second standard yaw rate, a relationship between the first standard yaw rate and the actual yaw rate, and a relationship between the second standard yaw rate and the actual yaw rate. In this case, it is appropriate that the electronic control unit determine that the disturbance occurs in the vehicle when the plurality of disturbance determination conditions are established simultaneously.

The lateral acceleration sensor generally outputs a detection value based on an inertial force generated through movement of the vehicle in the lateral direction. If the vehicle is inclined in the lateral direction, a downward slanting component of the gravity directly acts even though the vehicle does not move in the lateral direction. The lateral acceleration sensor outputs a detection value based on the downward slanting component of the gravity.

Therefore, even if the actual yaw rate of the vehicle in the same direction is detected, calculation results of the first standard yaw rate and the second standard yaw rate differ from each other between a case where the vehicle travels along the cant road (road inclined in the lateral direction (road width direction)) and a case where the vehicle veers by receiving the crosswind during traveling.

The crosswind received by the vehicle during traveling is an external force that hinders the driver's steering operation, that is, the disturbance that causes the vehicle to veer in a direction different from the direction expected by the driver. When the vehicle is traveling along the cant road, the vehicle veers in a downward slanting direction of the road surface, but an external force acting in this case is not the external force that hinders the driver's steering operation, that is, the disturbance that causes the vehicle to veer in a direction different from the direction expected by the driver.

In the aspect described above, the disturbance determination condition is set so that distinction can be made between the case where the vehicle veers by traveling along the cant road and the case where the vehicle veers by receiving the crosswind. The disturbance determination condition includes the cant traveling exclusion condition that is not established when the vehicle veers by traveling along the cant road but is established when the vehicle veers by receiving the crosswind.

According to the aspect described above, the disturbance that hinders the driver's steering operation can appropriately be detected by setting the disturbance determination condition. Thus, the disturbance can be detected early without the need to, for example, adjust the observer gains as in the case of the apparatus of JP 2004-98796 A.

In the aspect described above, the cant traveling exclusion condition may include a condition that defines a relationship in which a sign of a value obtained by subtracting the second standard yaw rate from the first standard yaw rate differs from a sign of a value obtained by subtracting the second standard yaw rate from the actual yaw rate.

When the vehicle travels along the cant road, the sign (positive or negative sign) of the value obtained by subtracting the second standard yaw rate from the first standard yaw rate is identical to the sign of the value obtained by subtracting the second standard yaw rate from the actual yaw rate. When the vehicle veers by receiving the crosswind, the sign of the value obtained by subtracting the second standard yaw rate from the first standard yaw rate is opposite to the sign of the value obtained by subtracting the second standard yaw rate from the actual yaw rate. In the aspect described above, by using those characteristics, the cant traveling exclusion condition includes the condition that defines the relationship in which the sign of the value obtained by subtracting the second standard yaw rate from the first standard yaw rate differs from the sign of the value obtained by subtracting the second standard yaw rate from the actual yaw rate.

According to the aspect described above, it is possible to suppress, with the simple cant traveling exclusion condition, the electronic control unit from erroneously determining that the vehicle is affected by the disturbance when the vehicle veers by traveling along the cant road.

In the aspect described above, the disturbance determination condition may include a condition that a deviation between the first standard yaw rate and the second standard yaw rate is larger than a first threshold and a deviation between the actual yaw rate and the second standard yaw rate is larger than a second threshold.

For example, when the lateral acceleration occurs in the vehicle though the steering angle is "0", the first standard yaw rate is not "0" but the second standard yaw rate is "0". In this case, the lateral external force may act on the vehicle. For example, when the yaw rate occurs in the vehicle though the steering angle is "0", the actual yaw rate is not "0" but the second standard yaw rate is "0". In this case, the lateral external force may act on the vehicle.

In the aspect described above, the disturbance determination condition includes the condition that the deviation between the first standard yaw rate and the second standard yaw rate is larger than the first threshold and the deviation between the actual yaw rate and the second standard yaw rate is larger than the second threshold. Since this condition is included in the disturbance determination condition, it can be estimated appropriately that the lateral external force acts on the vehicle.

In the aspect described above, the disturbance determination condition may include a condition that a deviation between the actual yaw rate and the first standard yaw rate is larger than a third threshold.

For example, the deviation between the first standard yaw rate and the actual yaw rate indicates the degree of a change in the behavior of the vehicle due to the external force acting in the lateral direction. When the deviation is small, the external force need not be handled as a disturbance that requires control on the behavior of the vehicle. When the deviation is large, the external force needs to be handled as the disturbance that requires the control on the behavior of the vehicle.

In the aspect described above, the disturbance determination condition includes the condition that the deviation between the actual yaw rate and the first standard yaw rate is larger than the third threshold. Since this condition is included in the disturbance determination condition, it can be estimated appropriately that the lateral external force acts on the vehicle.

In the aspect described above, the electronic control unit may be configured to use a neutral point relative steering angle as the piece of information related to the steering angle when calculating the first standard yaw rate and when calculating the second standard yaw rate. The neutral point relative steering angle is an angle obtained by converting the steering angle detected by the steering angle sensor into a relative angle to a steering angle neutral point. The electronic control unit may be configured to detect a situation in which the vehicle is traveling straightforward. The electronic control unit may be configured to correct, when the electronic control unit detects that the vehicle is traveling straightforward, the steering angle neutral point so that a deviation between the calculated first standard yaw rate and the actual yaw rate detected by the yaw rate sensor decreases.

When the vehicle veers in an undesirable direction due to the disturbance, it is desirable to start the vehicle behavior stabilization control as early as possible. To achieve the early start, it is performed, with high accuracy, the determination of whether the disturbance determination condition is established (hereinafter referred to as disturbance determination). It is difficult to perform the disturbance determination with high accuracy when variations are included in the detection values from the sensor device and the vehicle specifications for use in the disturbance determination. Therefore, performance of the disturbance determination may wait until the magnitude of the disturbance increases to some extent in consideration of the variations in advance. Thus, the start of the vehicle behavior stabilization control may be delayed.

In the aspect described above, the steering angle neutral point is corrected so as to collectively smooth out the variations included in the detection values from the sensor device and the variations included in the vehicle specifications.

In the vehicle control, the steering angle neutral point indicates a steering angle at which determination is made that the vehicle is traveling straightforward. Thus, the steering angle to be grasped for control is an angle determined with respect to the steering angle neutral point (zero steering angle point), that is, the angle obtained by converting the steering angle detected by the steering angle sensor into the relative angle to the steering angle neutral point (neutral point relative steering angle). For example, the neutral point relative steering angle is obtained by subtracting the steering angle neutral point from the steering angle detected by the steering angle sensor. Thus, the electronic control unit is configured to use, as the piece of information related to the steering angle, the neutral point relative steering angle that is the angle obtained by converting the steering angle detected by the steering angle sensor into the relative angle to the steering angle neutral point.

In the aspect described above, in order to collectively smooth out the variations included in the detection values from the sensor device and the variations included in the vehicle specifications, the electronic control unit is configured to detect the situation in which the vehicle is traveling straightforward, and correct, when the electronic control unit detects that the vehicle is traveling straightforward, the steering angle neutral point so that the deviation between the first standard yaw rate and the actual yaw rate decreases, that is, the deviation is closer to "0".

The first standard yaw rate is a value calculated by using the vehicle speed, the neutral point relative steering angle, the lateral acceleration, and the vehicle specifications. Even if variations are included in the vehicle speed, the steering angle, and the lateral acceleration detected by the sensor device or if variations are included in the vehicle specifications, the variations included in those parameters can collectively be smoothed out by correcting the steering angle neutral point. According to the aspect described above, the disturbance determination can be performed without being affected, to the extent possible, by the variations included in the detection values from the sensor device and in the vehicle specifications. Thus, the disturbance determination can be executed with high accuracy. As a result, disturbance determination information can be output early. For example, the vehicle behavior stabilization control can be executed satisfactorily.

In the aspect described above, the electronic control unit may be configured to determine that correction of variations in the sensor device and in the vehicle specifications is completed when the deviation between the first standard yaw rate and the actual yaw rate is equal to or smaller than a correction completion determination threshold through correction of the steering angle neutral point. The disturbance determination condition may include a condition that determination is made that the correction of the variations is completed.

In the aspect described above, the electronic control unit determines that the correction of the variations in the sensor device and in the vehicle specifications is completed when the deviation between the first standard yaw rate and the actual yaw rate is equal to or smaller than the correction completion determination threshold through the correction of the steering angle neutral point. The disturbance determination condition includes the condition that the determination is made that the correction of the variations is completed. Therefore, the disturbance determination can be performed without being affected, to the extent possible, by the variations included in the detection values from the sensor device and in the vehicle specifications. Thus, the disturbance determination can be executed with high accuracy. As a result, the disturbance determination information can be output early. For example, the vehicle behavior stabilization control can be executed satisfactorily.

In the aspect described above, the electronic control unit may be configured such that, when an elapsed time after the determination is made that the correction of the variations is completed reaches a set time, the electronic control unit cancels the determination that the correction of the variations is completed, and then determines again that the correction of the variations is completed when the deviation between the first standard yaw rate and the actual yaw rate is equal to or smaller than the correction completion determination threshold through the correction of the steering angle neutral point.

For example, the environment around the sensor device changes incessantly. Depending on the individual sensors included in the sensor device, detection characteristics (for example, temperature characteristics) change due to the change in the environment. Therefore, when the elapsed time after the determination is made that the correction of the variations is completed reaches the set time, the electronic control unit cancels the determination that the correction of the variations is completed, and then determines again that the correction of the variations is completed when the deviation between the first standard yaw rate and the actual yaw rate is equal to or smaller than the correction completion determination threshold through the correction of the steering angle neutral point. According to the aspect described above, the time limit is provided for the correction status indicating that the correction of the variations is completed. Thus, highly accurate disturbance determination can be executed with higher reliability.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
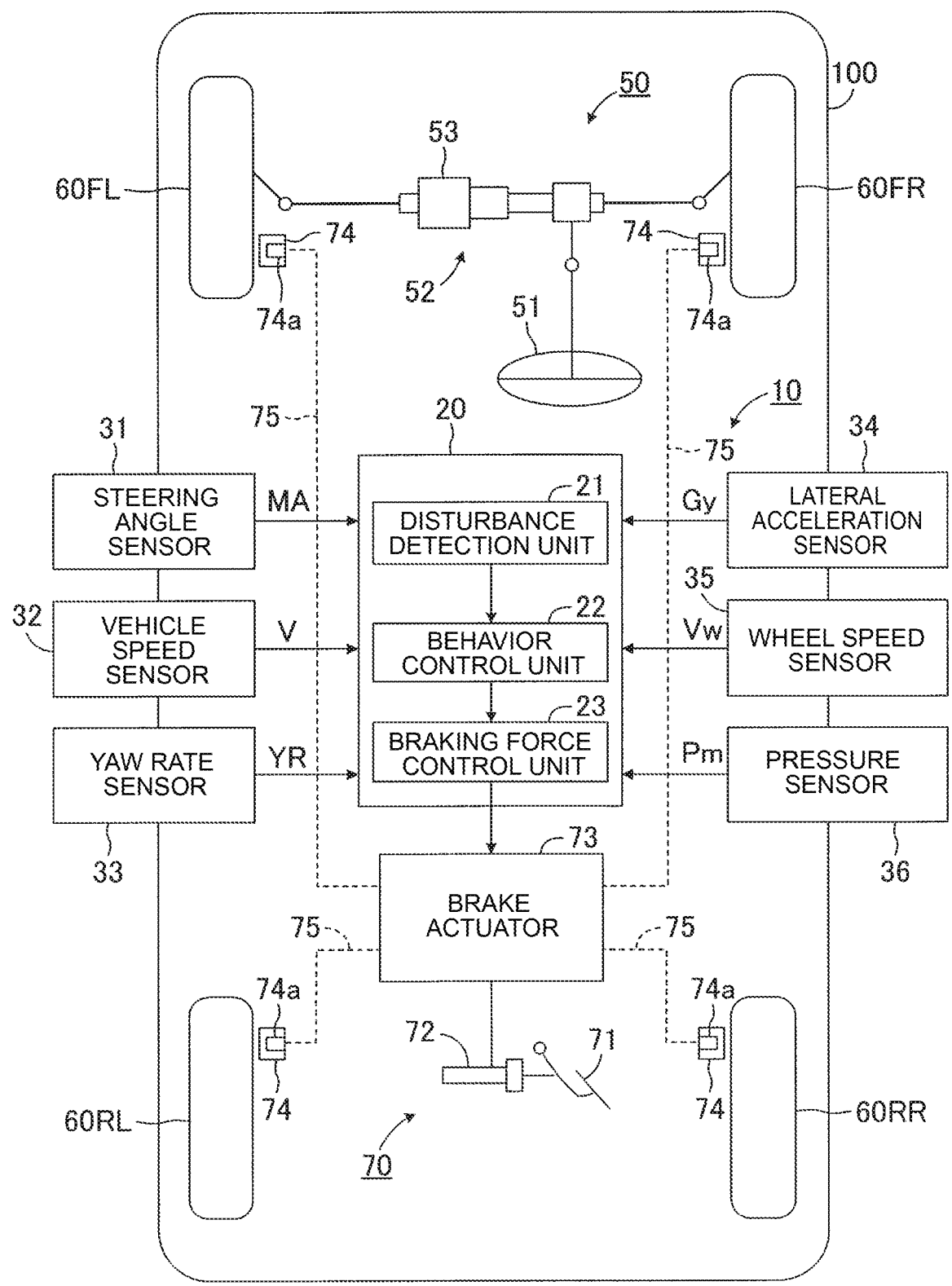
FIG. 1 is a schematic system configuration diagram of a behavior control apparatus according to an embodiment.

An embodiment is described below in detail with reference to the drawings. FIG. 1 is a schematic system configuration diagram of a behavior control apparatus including a vehicle disturbance detection apparatus of this embodiment.

A behavior control apparatus 10 is mounted on a vehicle 100 including a steering system 50 and a braking system 70. The behavior control apparatus 10 includes an electronic control unit (ECU) 20 configured to control behavior of the vehicle by controlling the braking system 70. The ECU 20 is an electric control unit including a microcomputer as a main component. The microcomputer herein includes a central processing unit (CPU), a read-only memory (ROM), a random-access memory (RAM), a non-volatile memory, and an interface (I/F). The CPU implements various functions by executing instructions (programs or routines) stored in the ROM.

The vehicle 100 includes a right front wheel 60FR and a left front wheel 60FL that are steered wheels, and a right rear wheel 60RR and a left rear wheel 60RL that are non-steered wheels. Although illustration is omitted from FIG. 1, driving forces are supplied to the right front wheel 60FR and the left front wheel 60FL from an engine via a transmission. The vehicle to which the disclosure is applied may be a front-wheel drive vehicle, a rear-wheel drive vehicle, or a four-wheel drive vehicle. The right front wheel 60FR, the left front wheel 60FL, the right rear wheel 60RR, and the left rear wheel 60RL are hereinafter referred to collectively as wheels 60 unless otherwise distinguished.

The steering system 50 includes an electric power steering system 52 to be driven in response to a driver's operation for a steering wheel 51. The electric power steering system 52 includes an electric motor 53, and turns the right front wheel 60FR and the left front wheel 60FL such that the electric motor 53 generates a steering assist torque in response to the driver's steering operation.

The braking system 70 includes a brake pedal 71, a master cylinder 72, a brake actuator 73, brake mechanisms 74, and hydraulic pipes 75. The master cylinder 72 generates a hydraulic pressure based on a depression force of the brake pedal 71, and supplies the generated hydraulic pressure to the brake actuator 73. The brake actuator 73 includes a hydraulic circuit interposed between the master cylinder 72 and the brake mechanisms 74. The hydraulic circuit includes an electric pump, a reservoir, and a plurality of electromagnetic valves. The electric pump increases a brake hydraulic pressure irrespective of the master cylinder pressure. The reservoir stores a brake operating fluid.

The brake mechanisms 74 are connected to the brake actuator 73 via the hydraulic pipes 75. The brake mechanisms 74 are each provided for corresponding one of the wheels 60. Each brake mechanism 74 includes a brake disc and a brake caliper. The brake disc rotates together with the wheel. The brake caliper is fixed to a vehicle body side. Each brake mechanism 74 generates a frictional braking force by pressing brake pads against the brake disc with a hydraulic pressure from a wheel cylinder 74a provided in the brake caliper. Thus, the brake mechanism 74 generates the braking force based on the brake hydraulic pressure supplied from the brake actuator 73.

The brake actuator 73 independently adjusts the brake hydraulic pressures to be applied to the wheels 60 by controlling various electromagnetic valves provided in the hydraulic circuit. The braking forces to be applied to the wheels 60 are determined based on the brake hydraulic pressures supplied to the wheel cylinders 74a.

The brake actuator 73 is connected to the ECU 20, and driving of the electromagnetic valves and the electric pump is controlled in response to a control signal from the ECU 20. By controlling the operation of the brake actuator 73 by the ECU 20, the braking forces of the wheels 60 can be controlled independently. In a state in which the operation of the brake actuator 73 is not controlled, the hydraulic pressure in the master cylinder 72 is supplied to the wheel cylinders 74a of the wheels 60.

A steering angle sensor 31, a vehicle speed sensor 32, a yaw rate sensor 33, a lateral acceleration sensor 34, wheel speed sensors 35, and a pressure sensor 36 are connected to the ECU 20, and detection signals output from those sensors are input to the ECU 20. For example, the steering angle sensor 31 is provided on a steering shaft, and outputs a detection signal indicating a steering angle MA that is a rotation angle of the steering wheel 51. The ECU 20 sets, as a control steering angle, a relative angle (MA-MA0) of the steering angle MA with respect to a steering angle neutral point MA0 that is a steering angle when the vehicle 100 travels straightforward, and performs various types of control by using the control steering angle (MA-MA0). Regarding the control steering angle (MA-MA0), a steering angle for turning to the left is represented by a positive value, and a steering angle for turning to the right is represented by a negative value.

The vehicle speed sensor 32 outputs a detection signal indicating a vehicle speed V (vehicle body speed). The yaw rate sensor 33 outputs a detection signal indicating a yaw rate YR of the vehicle 100. The yaw rate sensor 33 is designed so that a yaw rate YR having a positive value is output when the vehicle 100 is turning to the left and a yaw rate YR having a negative value is output when the vehicle 100 is turning to the right. The yaw rate YR detected by the yaw rate sensor 33 is hereinafter referred to also as an actual yaw rate $YR_{sen}$ for distinction from standard yaw rates described later.

The lateral acceleration sensor 34 outputs a detection signal indicating a lateral acceleration Gy that is an acceleration in a lateral direction of the vehicle 100 (vehicle width direction). The lateral acceleration sensor 34 is designed so that a detection signal indicating a lateral acceleration Gy having a positive value is output when the vehicle 100 is turning to the left and a detection signal indicating a lateral acceleration Gy having a negative value is output when the vehicle 100 is turning to the right. The lateral acceleration sensor 34 detects an inertial force proportional to the acceleration, and detects a direction of the lateral acceleration of the vehicle 100 based on a direction of the inertial force. For example, when the vehicle 100 moves in the lateral direction, the inertial force acts on the lateral acceleration sensor 34 through the movement of the vehicle 100. The lateral acceleration sensor 34 detects the magnitude of the lateral acceleration based on the magnitude of the inertial force, and detects the direction of the lateral acceleration based on the direction in which the inertial force acts.

For example, when the vehicle 100 turns to the right, a leftward inertial force acts on the lateral acceleration sensor 34. When the leftward inertial force is detected, the lateral acceleration sensor 34 outputs a detection signal indicating a lateral acceleration Gy having a negative value. When the vehicle 100 turns to the left, a rightward inertial force acts on the lateral acceleration sensor 34. When the rightward inertial force is detected, the lateral acceleration sensor 34 outputs a detection signal indicating a lateral acceleration Gy having a positive value.

The gravity constantly acts on the lateral acceleration sensor 34 irrespective of the motion of the vehicle 100. Therefore, when the vehicle 100 travels along a cant road (road inclined in the lateral direction (road width direction)), a downward slanting component of the gravity acts on the lateral acceleration sensor 34. For example, when the vehicle 100 is traveling straightforward along a road having a right downward slope, a force (lateral force) in the same direction as that of the inertial force when the vehicle 100 turns to the left acts on the lateral acceleration sensor 34. In this case, the lateral acceleration sensor 34 outputs a detection signal indicating a lateral acceleration Gy having a positive value. When the vehicle 100 is traveling straightforward along a road having a left downward slope, a force (lateral force) in the same direction as that of the inertial force when the vehicle 100 turns to the right acts on the lateral acceleration sensor 34. In this case, the lateral acceleration sensor 34 outputs a detection signal indicating a lateral acceleration Gy having a negative value.

The wheel speed sensors 35 are provided on the right and left, front and rear wheels 60, and output detection signals indicating wheel speeds Vw that are rotation speeds of the wheels 60. The vehicle speed sensor 32 described above may be a sensor (detector) configured to estimate the vehicle speed V based on the detection signals from the four wheel speed sensors 35. The ECU 20 may estimate the vehicle speed V based on the detection signals from the four wheel speed sensors 35 while the four wheel speed sensors 35 are regarded as the vehicle speed sensor 32.

The pressure sensor 36 outputs a detection signal indicating a master cylinder pressure Pm that is the pressure in the master cylinder 72.

Next, functions of the ECU 20 are described. Focusing on the functions of the ECU 20, the ECU 20 includes a disturbance detection unit 21, a behavior control unit 22, and a braking force control unit 23.

The disturbance detection unit 21 detects a disturbance that is a force (external force) in the lateral direction of the vehicle. The force acts on the vehicle 100 to cause the vehicle 100 to veer undesirably. For example, the disturbance is a wind blowing onto the vehicle 100 in the lateral direction of the vehicle (that is, a crosswind). The vehicle 100 may also veer undesirably when one of the right and left wheels 60 enters a puddle. Therefore, an external force received by the vehicle 100 when the vehicle 100 enters the puddle is also detected as the disturbance. When the disturbance detection unit 21 detects the disturbance (determines that the disturbance is present), the disturbance detection unit 21 transmits disturbance detection information to the behavior control unit 22.

When the behavior control unit 22 receives the disturbance detection information transmitted from the disturbance detection unit 21, the behavior control unit 22 controls the braking forces of the wheels 60 so as to suppress the undesirable veer of the vehicle 100. For example, the behavior control unit 22 controls a braking force difference between the right and left wheels 60 to generate an anti-yaw moment for canceling a yaw moment that causes the veer of the vehicle 100. In this case, the behavior control unit 22 outputs a braking force control command to the braking force control unit 23. The braking force control unit 23 independently controls the braking forces of the wheels 60 by controlling the operation of the brake actuator 73 in response to the braking force control command from the behavior control unit 22. Thus, the anti-yaw moment is applied to the vehicle 100, and the behavior of the vehicle 100 can be stabilized.

Disturbance Determination Processing by Disturbance Detection Unit 21

The disturbance detection unit 21 of the ECU 20 has a function of determining whether a lateral disturbance that affects the vehicle 100 (lateral external force that causes the vehicle 100 to veer in an undesirable direction) is present. Every time a predetermined short time elapses, the steering angle MA detected by the steering angle sensor 31, the vehicle speed V detected by the vehicle speed sensor 32, the actual yaw rate $YR_{sen}$ detected by the yaw rate sensor 33, and the lateral acceleration Gy detected by the lateral acceleration sensor 34 are input to the disturbance detection unit 21.

The configuration including the disturbance detection unit 21 and the sensor devices (steering angle sensor 31, vehicle speed sensor 32, yaw rate sensor 33, and lateral acceleration sensor 34) can be regarded as the vehicle disturbance detection apparatus of the disclosure.

The disturbance detection unit 21 stores a stability factor Kh, an overall steering gear ratio n, and a wheelbase L as vehicle specifications for use in the determination of whether the disturbance is present. The vehicle specifications may not be stored in the disturbance detection unit 21, but may be stored in another ECU. In this case, the vehicle specification information may be input from the other ECU to the disturbance detection unit 21.

The disturbance detection unit 21 stores the steering angle neutral point MA0. As described later, the steering angle neutral point MA0 is updated in succession while the vehicle 100 is traveling straightforward.

The disturbance detection unit 21 calculates two types of standard yaw rate for the determination of whether the disturbance is present. A first standard yaw rate $YR_{std}1$, which is one of the two types of standard yaw rate, is calculated based on Expression (1).

$$YR_{std}1 = \frac{V \cdot (MA - MA0)}{n \cdot L} - Gy \cdot V \cdot Kh \qquad (1)$$

A second standard yaw rate $YR_{std}2$, which is the other type of standard yaw rate, is calculated based on Expression (2).

$$YR_{std}2 = \frac{V \cdot (MA - MA0)}{n \cdot L} \cdot \frac{1}{1 + Kh \cdot V^2} \qquad (2)$$

The first standard yaw rate $YR_{std}1$ can be estimated from the vehicle speed V, the control steering angle (MA-MA0), the lateral acceleration Gy, and the vehicle specifications (Kh, n, L), and is calculated based on those values. The second standard yaw rate $YR_{std}2$ can be estimated from the vehicle speed V, the control steering angle (MA-MA0), and the vehicle specifications (Kh, n, L), and is calculated based on those values. Thus, the arithmetic expression of the first standard yaw rate $YR_{std}1$ (that is, the right-hand side of Expression (1)) includes the lateral acceleration Gy as a calculation parameter, but the arithmetic expression of the second standard yaw rate $YR_{std}2$ (that is, the right-hand side of Expression (2)) does not include the lateral acceleration Gy as a calculation parameter.

When a disturbance determination condition is established, the disturbance detection unit 21 determines that the lateral disturbance affects the vehicle 100. The disturbance determination condition is established when a first condition to a fifth condition described below are all established.
First condition: $|YR_{std}1-YR_{std}2|>\Delta YR_{ref}1$
Second condition: $|YR_{sen}-YR_{std}2|>\Delta YR_{ref}2$
Third condition: $|YR_{std}1-YR_{sen}|>\Delta YR_{ref}3$
Fourth condition: $((YR_{std}1-YR_{std}2)\cdot(YR_{sen}-YR_{std}2))<0$
Fifth condition: correction of a total variation completed The first condition is that the magnitude of a deviation between the first standard yaw rate $YR_{std}1$ and the second standard yaw rate $YR_{std}2$ is larger than a first threshold $\Delta YR_{ref}1$. For example, when the lateral acceleration occurs in the vehicle 100 though the control steering angle (MA-MA0) is "0", the first standard yaw rate $YR_{std}1$ is not "0", but the second standard yaw rate $YR_{std}2$ is "0". In this case, a force may act on the vehicle 100 in the lateral direction.

The second condition is that the magnitude of a deviation between the actual yaw rate $YR_{sen}$ and the second standard yaw rate $YR_{std}2$ is larger than a second threshold $\Delta YR_{ref}2$. For example, when the yaw rate occurs in the vehicle 100 though the control steering angle (MA-MA0) is "0", the actual yaw rate $YR_{sen}$ is not "0", but the second standard yaw rate $YR_{std}2$ is "0". In this case, a force may act on the vehicle 100 in the lateral direction.

The third condition is that the magnitude of a deviation between the first standard yaw rate $YR_{std}1$ and the actual yaw rate $YR_{sen}$ is larger than a third threshold $\Delta YR_{ref}3$. The magnitude of the deviation between the first standard yaw rate $YR_{std}1$ and the actual yaw rate $YR_{sen}$ indicates the degree of a change in the behavior of the vehicle 100 due to an external force acting in the lateral direction. When the deviation is small, the external force acting on the vehicle 100 need not be handled as a "significant disturbance that arouses the need to control the behavior of the vehicle 100". When the deviation is large, the external force acting on the vehicle 100 needs to be handled as the "significant disturbance that arouses the need to control the behavior of the vehicle 100".

The fourth condition is that the product of a value obtained by subtracting the second standard yaw rate $YR_{std}2$ from the first standard yaw rate $YR_{std}1$ and a value obtained by subtracting the second standard yaw rate $YR_{std}2$ from the actual yaw rate $YR_{sen}$ is a negative value. In other words, the fourth condition defines a relationship in which the sign of the value obtained by subtracting the second standard yaw rate $YR_{std}2$ from the first standard yaw rate $YR_{std}1$ differs from the sign of the value obtained by subtracting the second standard yaw rate $YR_{std}2$ from the actual yaw rate $YR_{sen}$.

The fourth condition excludes a situation in which the vehicle 100 is traveling along a cant road (road inclined in the lateral direction (road width direction)). The reason is described below.

Figure 2:
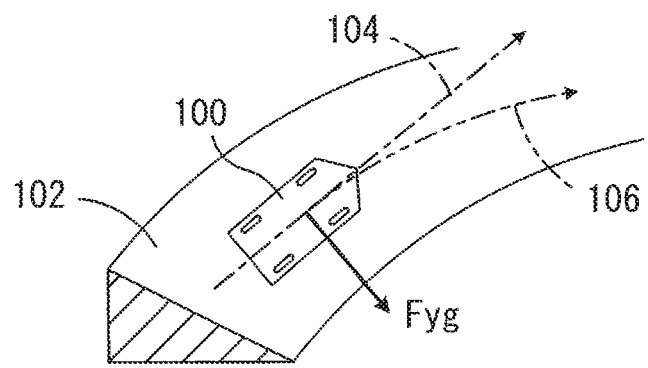
FIG. 2 is a diagram for describing behavior of a vehicle when the vehicle travels along a cant road.

When the vehicle 100 is traveling along a cant road 102 as illustrated in FIG. 2, a lateral force Fyg acts on the vehicle 100 in a downward slanting direction of the road surface due to the gravity. The vehicle 100 veers in the downward slanting direction of the road surface as indicated by an arrow 106 of a long dashed double-short dashed line with respect to an original traveling direction determined based on the steering angle (direction indicated by an arrow 104 of a long dashed short dashed line). This phenomenon is a natural phenomenon, but is not a phenomenon that occurs when the vehicle 100 is affected by a disturbance that hinders the driver's steering operation (disturbance that causes the vehicle 100 to veer in a direction different from a direction expected by the driver).

Figure 3:
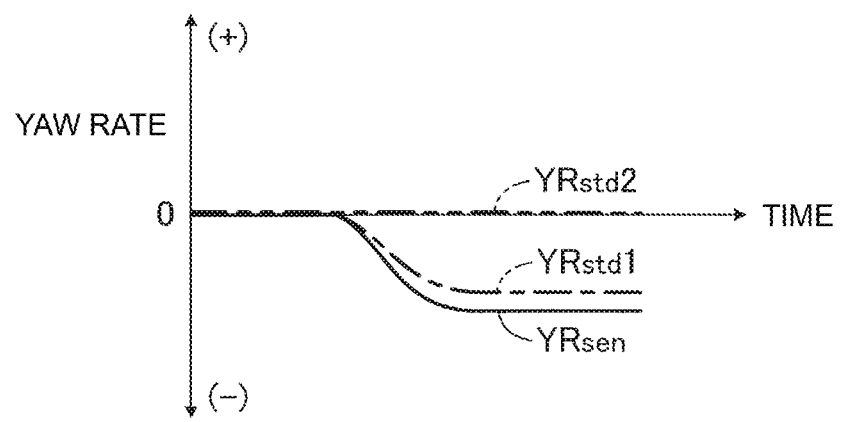
FIG. 3 is a diagram illustrating an example of changes in an actual yaw rate $YR_{sen}$, a first standard yaw rate $YR_{std}1$, and a second standard yaw rate $YR_{std}2$ when the vehicle travels along the cant road.

When the vehicle 100 travels along the cant road 102, the lateral force Fyg, which is a lateral component of the gravity, acts on the lateral acceleration sensor 34. The lateral force Fyg acts in the downward slanting direction of the road surface (rightward direction). In this example, the lateral acceleration Gy detected by the lateral acceleration sensor 34 has a positive value. Therefore, the first standard yaw rate $YR_{std}1$ calculated based on Expression (1) changes similarly to the actual yaw rate $YR_{sen}$ as illustrated in FIG. 3. In FIG. 3, the actual yaw rate $YR_{sen}$ is represented by a continuous line, the first standard yaw rate $YR_{std}1$ is represented by a long dashed short dashed line, and the second standard yaw rate $YR_{std}2$ is represented by a long dashed double-short dashed line.

The second standard yaw rate $YR_{std}2$ calculated based on Expression (2) does not include the lateral acceleration Gy as the calculation parameter, and does not therefore change as illustrated in FIG. 3 if the vehicle speed V and the control steering angle (MA-MA0) are constant. In this case, the control steering angle (MA-MA0) remains "0", and therefore the second standard yaw rate $YR_{std}2$ remains "0".

Therefore, when the vehicle 100 travels along the cant road 102, the direction (lateral direction) of the first standard yaw rate $YR_{std}1$ and the direction (lateral direction) of the actual yaw rate $YR_{sen}$ are identical to each other with respect to the second standard yaw rate $YR_{std}2$ as illustrated in FIG. 3. Thus, the signs (positive or negative signs) of the value $(YR_{std}1-YR_{std}2)$ obtained by subtracting the second standard yaw rate $YR_{std}2$ from the first standard yaw rate $YR_{std}1$ and the value $(YR_{sen}-YR_{std}2)$ obtained by subtracting the second standard yaw rate $YR_{std}2$ from the actual yaw rate $YR_{sen}$ are identical to each other. Accordingly, the value obtained by multiplying together the value ($YR_{std}1-YR_{std}2$) obtained by subtracting the second standard yaw rate $YR_{std}2$ from the first standard yaw rate $YR_{std}1$ and the value ($YR_{sen}-YR_{std}2$) obtained by subtracting the second standard yaw rate $YR_{std}2$ from the actual yaw rate $YR_{sen}$ is a positive value.

Thus, the fourth condition is not established if the disturbance that affects the vehicle 100 is only the disturbance due to the cant road.

Figure 4:
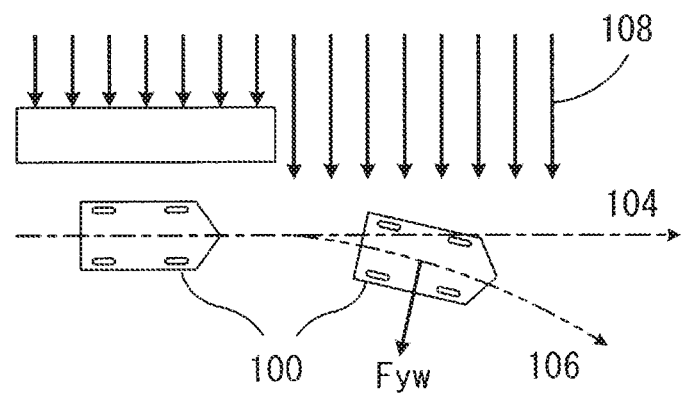
FIG. 4 is a diagram for describing behavior of the vehicle when the vehicle receives a crosswind during traveling.

When the vehicle 100 suddenly receives a crosswind 108 during traveling as illustrated in FIG. 4, a lateral force Fyw acts on the vehicle 100 in a leeward direction due to the crosswind 108. The vehicle 100 veers in the leeward direction as indicated by an arrow of a long dashed double-short dashed line 106 with respect to an original traveling direction 104 determined based on the steering angle. This phenomenon is an undesirable phenomenon in which the behavior of the vehicle 100 is changed unnaturally, and is a phenomenon in which the vehicle 100 is affected by the disturbance that hinders the driver's steering operation (disturbance that causes the vehicle 100 to veer in a direction different from the direction expected by the driver). Thus, it is determined that the lateral disturbance affects the vehicle 100.

When the vehicle receives the crosswind during traveling, an inertial force to an outer side of turning acts on the lateral acceleration sensor 34 due to the veer of the vehicle 100. That is, an inertial force acts on the lateral acceleration sensor 34 in a windward direction along with lateral displacement of the vehicle 100. In this example, the lateral acceleration Gy detected by the lateral acceleration sensor 34 has a negative value whose absolute value is relatively large.

Figure 5:
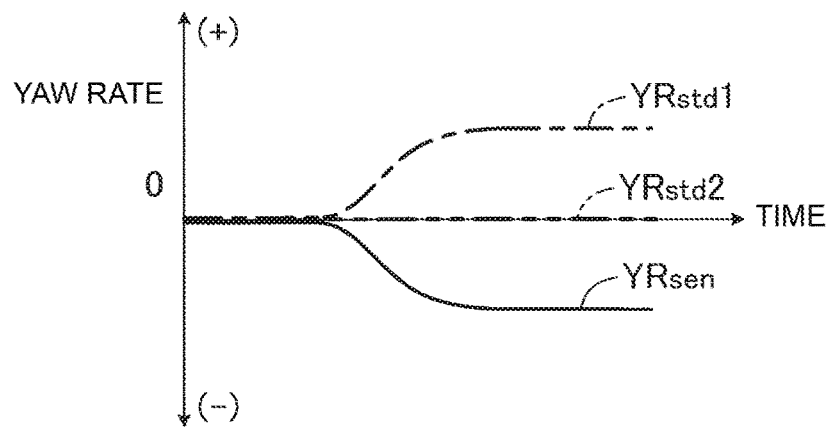
FIG. 5 is a diagram illustrating an example of changes in the actual yaw rate $YR_{sen}$, the first standard yaw rate $YR_{std}1$, and the second standard yaw rate $YR_{std}2$ when the vehicle receives the crosswind during traveling.

Thus, as illustrated in FIG. 5, the first standard yaw rate $YR_{std}1$ has a value whose sign is opposite to the sign of the actual yaw rate $YR_{sen}$. The second standard yaw rate $YR_{std}2$ does not include the lateral acceleration Gy as the calculation parameter, and does not therefore change if the vehicle speed V and the control steering angle (MA-MA0) are constant. In this case, the control steering angle (MA-MA0) remains "0", and therefore the second standard yaw rate $YR_{std}2$ remains "0".

Therefore, when the vehicle receives the crosswind during traveling, the direction (lateral direction) of the first standard yaw rate $YR_{std}1$ and the direction (lateral direction) of the actual yaw rate $YR_{sen}$ are opposite to each other with respect to the second standard yaw rate $YR_{std}2$ as illustrated in FIG. 5. Thus, when the vehicle receives the crosswind during traveling, the signs (positive or negative signs) of the value ($YR_{std}1-YR_{std}2$) obtained by subtracting the second standard yaw rate $YR_{std}2$ from the first standard yaw rate $YR_{std}1$ and the value ($YR_{sen}-YR_{std}2$) obtained by subtracting the second standard yaw rate $YR_{std}2$ from the actual yaw rate $YR_{sen}$ are opposite to each other. Accordingly, the value obtained by multiplying together the value ($YR_{std}1-YR_{std}2$) obtained by subtracting the second standard yaw rate $YR_{std}2$ from the first standard yaw rate $YR_{std}1$ and the value ($YR_{sen}-YR_{std}2$) obtained by subtracting the second standard yaw rate $YR_{std}2$ from the actual yaw rate $YR_{sen}$ is a negative value.

Thus, the fourth condition is established if the disturbance that affects the vehicle 100 is only the disturbance due to the crosswind.

As understood from the above description, the disturbance detection unit 21 can distinguish the case where the vehicle 100 travels along the cant road 102 and the case where the vehicle 100 travels while receiving the crosswind 108 because the fourth condition is included in the disturbance determination condition. In other words, the disturbance detection unit 21 can be restrained from determining that the vehicle 100 is affected by the "disturbance that hinders the driver's steering operation (disturbance that causes the vehicle 100 to veer in a direction different from the direction expected by the driver)", when the vehicle 100 is traveling along the cant road 102.

The fifth condition is established when it is determined that the accuracy of the disturbance determination is high through processing of correcting the total variation as described below.

When the first to fifth conditions are all established (simultaneously established), the disturbance detection unit 21 determines that the disturbance determination condition is established, thereby determining that the lateral disturbance affects the vehicle 100.

Processing of Correcting Total Variation

When the vehicle veers by being affected by the disturbance that hinders the driver's steering operation, it is desirable to start vehicle behavior stabilization control as early as possible. To achieve the early start, it is performed, with high accuracy, the determination of whether the disturbance determination condition is established (hereinafter referred to as disturbance determination). It is difficult to perform the disturbance determination with high accuracy when variations are present in the detection values from the sensors (steering angle sensor 31, vehicle speed sensor 32, yaw rate sensor 33, and lateral acceleration sensor 34) and the vehicle specifications for use in the disturbance determination. The first to fifth conditions described above are determined in consideration of the variations in advance (for example, the thresholds $\Delta YR_{ref}1$, $\Delta YR_{ref}2$, and $\Delta YR_{ref}3$ of the first to third conditions are set relatively large). Therefore, it is difficult to start the vehicle behavior stabilization control early.

For example, if the vehicle veers due to the disturbance (crosswind or puddle), a vehicle behavior range in which the driver expects veer prevention is a range of 1.5 to 2.0 deg/sec or higher in terms of the yaw rate, or a range of 0.1 G to 0.15 G or higher in terms of the lateral acceleration. As a comparative example, a control intervention timing of a known anti-skid apparatus is a timing when the lateral acceleration is about 0.6 G on a dry road surface. To meet the driver's expectation for veer prevention, the disturbance is detected early.

If the disturbance determination is performed in the vehicle behavior range in which the driver expects veer prevention by using a general-purpose yaw rate sensor and a general-purpose lateral acceleration sensor, the ratio of variations to the detection values from the sensors (sensor variations) may increase.

In this embodiment, the steering angle neutral point MA0 is corrected so as to collectively smooth out the variations present in the sensors described above and the variations present in the vehicle specifications. The variations present in the sensors and the variations present in the vehicle specifications are hereinafter referred to collectively as a total variation.

When it is estimated that the vehicle 100 is traveling straightforward, the disturbance detection unit 21 updates the steering angle neutral point MA0 so that a deviation $\Delta YR$ between the first standard yaw rate $YR_{std}1$ and the actual yaw rate $YR_{sen}$ is closer to "0". This processing is referred to as steering angle neutral point update processing.

The disturbance detection unit 21 updates the steering angle neutral point MA0 by the following method.

First, as represented by Expression (3), the disturbance detection unit 21 calculates the deviation ΔYR between the first standard yaw rate $YR_{std}1$ and the actual yaw rate $YR_{sen}$ every time a predetermined time elapses, and integrates the deviation ΔYR for a set time T1. For example, the set time T1 is about 1 second.

$$\int \Delta YR dt = \int_0^{T1} (YR_{std}1 - YR_{sen}) dt \quad (3)$$

When the integration of the deviation ΔYR is completed, the disturbance detection unit 21 calculates an average deviation $\Delta YR_{ave}$ by dividing the integrated value by an integration count N as represented by Expression (4).

$$\Delta YR_{ave} = \frac{\int \Delta YR dt}{N} \quad (4)$$

Then, the disturbance detection unit calculates a correction value α for the steering angle neutral point MA0 as represented by Expression (5).

$$\alpha = \Delta YR_{ave} \cdot \frac{n \cdot L}{V} \quad (5)$$

The correction value α is calculated by multiplying the average deviation $\Delta YR_{ave}$ by the overall steering gear ratio n and the wheelbase L and dividing the resultant value by the vehicle speed V.

When the correction value α is calculated, the disturbance detection unit 21 adds the correction value α to a previous steering angle neutral point MA0 (that is, a steering angle neutral point MA0 calculated earlier by a predetermined time), and performs low-pass filtering (LPF) for the addition result, thereby acquiring an updated (current) steering angle neutral point MA0: updated MA0=LPF{MA0 (previous value)+α}

While the vehicle 100 remains in the straightforward traveling condition, the disturbance detection unit 21 performs the processing of updating the steering angle neutral point MA0 every time the set time T1 elapses. Thus, the deviation ΔYR between the first standard yaw rate $YR_{std}1$ and the actual yaw rate YR is closer to "0".

Figure 6:
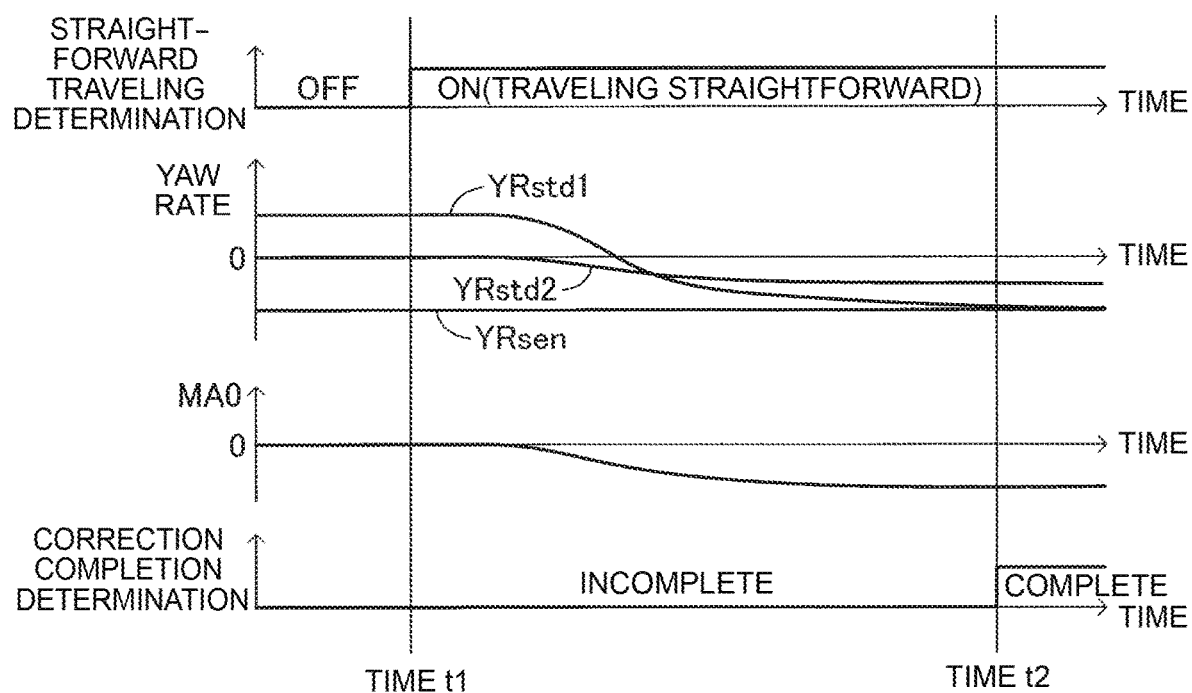
FIG. 6 is a graph illustrating an example of changes in the first standard yaw rate $YR_{std}1$, the second standard yaw rate $YR_{std}2$, and a steering angle neutral point MA0 through processing of updating the steering angle neutral point MA0.

FIG. 6 is a graph illustrating how the total variation is smoothed out through the update of the steering angle neutral point MA0. When it is determined at a time t1 that the vehicle 100 is traveling straightforward, the steering angle neutral point MA0 is repeatedly updated as described above. Thus, the deviation ΔYR between the first standard yaw rate $YR_{std}1$ and the actual yaw rate $YR_{sen}$ is closer to "0".

When the deviation ΔYR is equal to or smaller than a correction completion threshold $\Delta YR_{kousei}$ (at a time t2 in FIG. 6), the disturbance detection unit 21 determines that the correction of the total variation is completed. That is, when the deviation ΔYR is equal to or smaller than the correction completion threshold $\Delta YR_{kousei}$, the disturbance detection unit 21 determines that the fifth condition described above is established.

This determination result is maintained for a set time $T_{ref}$ as described later, and is invalidated when the set time $T_{ref}$ elapses (correction is incomplete). Then, the processing described above is repeated during a period in which the vehicle 100 is in the straightforward traveling condition. When the correction completion condition is established, that is, when it is detected that the deviation ΔYR between the first standard yaw rate $YR_{std}1$ and the actual yaw rate $YR_{sen}$ is equal to or smaller than the correction completion threshold $\Delta YR_{kousei}$, it is determined again that the correction of the total variation is completed.

Straightforward Traveling Determination Conditions

The processing of updating the steering angle neutral point MA0 is performed when it is determined that the vehicle 100 is in the straightforward traveling condition. The disturbance detection unit 21 determines that the vehicle 100 is in the straightforward traveling condition when the following four straightforward traveling determination conditions are all established.

First straightforward traveling determination condition: $|YR_{sen}| < YR_{senref}1$ Second straightforward traveling determination condition: $|Gy| < Gy_{ref}1$ Third straightforward traveling determination condition: $|\omega| < \omega_{ref}1$ Fourth straightforward traveling determination condition: $V > V_{ref}1$ In the conditions, ω represents a steering wheel angular velocity, which is calculated by differentiating the steering angle MA in terms of time.

The first straightforward traveling determination condition is established when a magnitude $|YR_{sen}|$ of the actual yaw rate $YR_{sen}$ detected by the yaw rate sensor 33 is smaller than a straightforward traveling determination threshold $YR_{senref}1$. The second straightforward traveling determination condition is established when a magnitude |Gy| of the lateral acceleration Gy detected by the lateral acceleration sensor 34 is smaller than a straightforward traveling determination threshold $Gy_{ref}1$. The third straightforward traveling determination condition is established when a magnitude |ω| of the steering wheel angular velocity is smaller than a straightforward traveling determination threshold $\omega_{ref}1$. The fourth straightforward traveling determination condition is established when the vehicle speed V detected by the vehicle speed sensor 32 is larger than a straightforward traveling determination permission threshold $V_{ref}1$.

Disturbance Determination Control Routine

Figure 7:
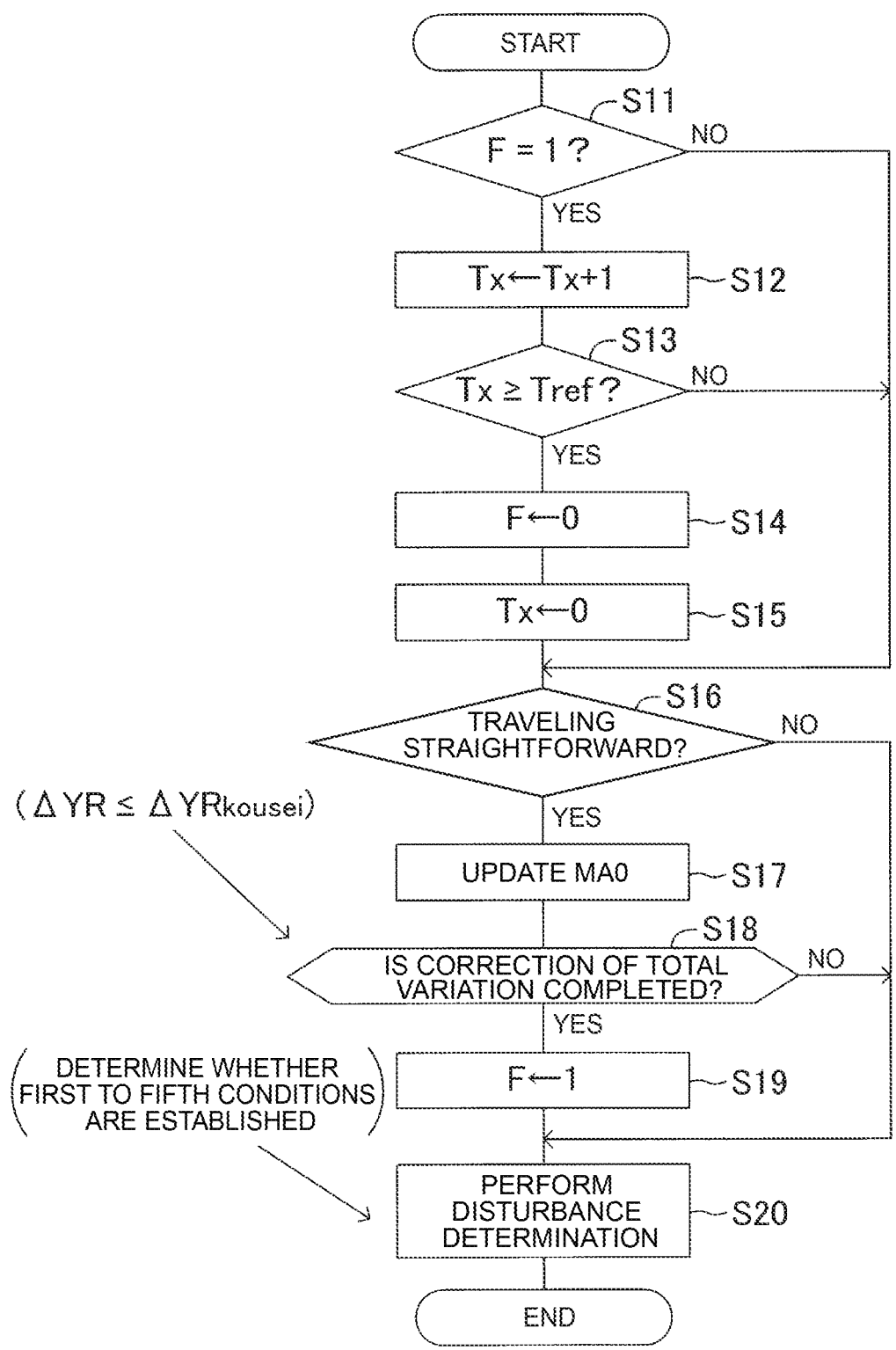
FIG. 7 is a flowchart illustrating a disturbance determination control routine.

Next, a specific example of the disturbance determination processing is described. FIG. 7 illustrates a disturbance determination control routine to be executed by the disturbance detection unit 21. The disturbance detection unit 21 executes the disturbance determination control routine every time a predetermined time elapses during a period in which an ignition switch is ON.

When the disturbance determination control routine is started, the disturbance detection unit 21 reads a correction completion flag F in Step S11, and determines whether the value of the correction completion flag F is "1". The correction completion flag F indicates whether the correction of the total variation is completed (correction complete state). When the value is "1", the correction completion flag F indicates that the correction of the total variation is completed. When the value is "0", the correction completion flag F indicates that the correction of the total variation is not completed (correction incomplete state).

When the value of the correction completion flag F is "1" (S11: Yes), that is, in the correction complete state, the disturbance detection unit 21 advances the processing to Step S12. When the value of the correction completion flag F is "0" (S11: No), that is, in the correction incomplete state, the disturbance detection unit 21 advances the processing to Step S16.

Immediately after this routine is started, the correction completion flag F is set to "0". Therefore, the disturbance detection unit 21 advances the processing to Step S16, and determines whether the vehicle 100 is traveling straightforward. This determination processing is processing of determining whether the four straightforward traveling determination conditions described above are established.

When at least one of the "four straightforward traveling determination conditions" is not established (S16: No), the disturbance detection unit 21 advances the processing to Step S20. In Step S20, the disturbance detection unit 21 executes the disturbance determination processing for determining whether a disturbance is present. This processing includes processing of determining whether the first to fifth conditions described above are established. In this case, the correction completion flag F is set to "0" (the fifth condition is not established), and therefore the disturbance detection unit 21 determines that the disturbance determination condition is not established without performing determination on the first to fourth conditions. Thus, it is not determined that the disturbance that affects the vehicle in the lateral direction occurs.

The disturbance detection unit 21 repeats the disturbance determination control routine every time a predetermined time elapses. When the processing described above is repeated and the four straightforward traveling determination conditions are all established (S16: Yes), the disturbance detection unit 21 advances the processing to Step S17. In Step S17, the disturbance detection unit 21 executes the processing of updating the steering angle neutral point MA0 as described above.

In Step S18, the disturbance detection unit 21 determines whether the total variation correction completion condition is established. That is, the disturbance detection unit 21 determines whether the deviation ΔYR between the first standard yaw rate $YR_{std}1$ and the actual yaw rate $YR_{sen}$ is equal to or smaller than the correction completion threshold $ΔYR_{kousei}$. When the total variation correction completion condition is not established (S18: No), the disturbance detection unit 21 advances the processing to Step S20.

When the vehicle is traveling straightforward (the four straightforward traveling determination conditions are all established), the processing of updating the steering angle neutral point MA0 is repeated in Step S17. Through the update processing, the deviation ΔYR between the first standard yaw rate $YR_{std}1$ and the actual yaw rate YR gradually decreases. When the total variation correction completion condition ($ΔYR≤ΔYR_{kousei}$) is established (S18: Yes), the disturbance detection unit 21 sets the value of the correction completion flag F to "1" in Step S19, and advances the processing to Step S20.

In Step S20, it is determined whether the remaining four conditions (that is, the first to fourth conditions) are established in the situation in which the fifth condition is established (F=1).

When any one of the first to fifth conditions is not established, the disturbance detection unit 21 determines in Step S20 that "disturbance is absent", and temporarily terminates the disturbance determination control routine.

After the value of the correction completion flag F is set to "1", the determination in Step S11 is "Yes". The disturbance detection unit 21 advances the processing to Step S12, and increments a timer value $T_x$ by "1" ($T_x=T_x+1$). The timer value $T_x$ indicates the duration of the correction complete state as understood from processing described later. An initial value of the timer value $T_x$ is "0". In Step S13, the disturbance detection unit 21 determines whether the timer value $T_x$ is equal to or larger than the set time $T_{ref}$. In Step S13, it is determined whether an elapsed time from a timing when the correction of the total variation is completed reaches the set time $T_{ref}$.

When the timer value $T_x$ is smaller than the set time $T_{ref}$ (S13: No), the disturbance detection unit 21 advances the processing to Step S16, and executes the processing described above. When the timer value $T_x$ is equal to or larger than the set time $T_{ref}$ (S13: Yes), the disturbance detection unit 21 sets the value of the correction completion flag F to "0" (F: 1→0) in Step S14, and clears the timer value $T_x$ to "0" in Step S15. At this time, the total variation correction status is set to "incomplete".

When the timer value $T_x$ is cleared to "0" in Step S15, the disturbance detection unit 21 advances the processing to Step S16, and repeats the processing described above.

Thus, even when the total variation correction completion condition is established, the validity (effective period) is limited within the set time $T_{ref}$. When the total variation correction status is set to "incomplete" but then the total variation correction completion condition is established, the value of the correction completion flag F is set to "1" again (see Step S18 and Step S19). That is, it is determined that the correction of the total variation is completed.

When the five conditions (first to fifth conditions) are all established in Step S20 in the situation in which the value of the correction completion flag F is set to "1", the disturbance detection unit 21 determines that "disturbance is present". In this case, the disturbance detection unit 21 determines that the "disturbance that hinders the driver's steering operation (disturbance that causes the vehicle 100 to veer in a direction different from the direction expected by the driver)" affects the vehicle 100, and outputs a disturbance detection signal to the behavior control unit 22.

When the vehicle 100 is affected by the disturbance, the stability of the behavior of the vehicle 100 decreases. Therefore, the behavior control unit 22 executes braking force control for stabilizing the behavior of the vehicle 100 (vehicle behavior stabilization control) during a period in which the disturbance detection signal is received.

For example, the behavior control unit 22 calculates, based on Expression (6), a drift state amount DS indicating a drift state of the vehicle 100.

$$DS = \text{sign}YR_{sen}(YR_{std}1 - YR_{sen}) \quad (6)$$

In Expression (6), $\text{sign}YR_{sen}$ represents the sign (positive or negative sign) of the actual yaw rate $YR_{sen}$.

The behavior control unit 22 determines whether the vehicle 100 understeers by determining whether the drift state amount DS has a positive value. When the behavior control unit 22 determines that the vehicle 100 understeers, the behavior control unit 22 calculates, based on the drift state amount DS and the turning direction of the vehicle 100, a target yaw moment and a target deceleration for reducing the degree of understeer of the vehicle 100 by referring to a map (not illustrated) set in advance. The behavior control unit 22 controls the braking forces of the wheels 60 through procedures publicly known in this technical field so that the target yaw moment and the target deceleration are attained.

When the behavior control unit 22 determines that the vehicle 100 oversteers, the behavior control unit 22 calculates, based on the drift state amount DS and the turning direction of the vehicle 100, a target yaw moment and a target deceleration for reducing the degree of oversteer of the vehicle 100 by referring to a map (not illustrated) set in advance. The behavior control unit 22 controls the braking forces of the wheels 60 through procedures publicly known in this technical field so that the target yaw moment and the target deceleration are attained.

The behavior control apparatus 10 of this embodiment described above attains the following actions and effects.

(1) It is determined whether a disturbance for which the vehicle behavior stabilization control needs to be executed is present based on the disturbance determination condition that defines the relationship among the three types of yaw rate, which are the actual yaw rate $YR_{sen}$ detected by the yaw rate sensor 33, the first standard yaw rate $YR_{std}1$ that includes the detection value Gy from the lateral acceleration sensor 34 as the calculation parameter, and the second standard yaw rate $YR_{std}2$ that does not include the detection value Gy from the lateral acceleration sensor 34 as the calculation parameter.

(2) The disturbance determination condition includes the fourth condition that allows distinction between the situation in which the vehicle 100 travels while receiving the crosswind (the vehicle 100 receives the lateral external force that causes the vehicle 100 to veer in a direction different from the direction expected by the driver) and the situation in which the vehicle 100 travels along the cant road (the vehicle 100 does not receive the lateral external force that causes the vehicle 100 to veer in a direction different from the direction expected by the driver). Therefore, it is possible to make a determination that "disturbance is present" when the vehicle 100 receives the crosswind, but to suppress an erroneous determination that "disturbance is present" when the vehicle 100 travels along the cant road.

(3) Accordingly, the disturbance that hinders the driver's steering operation can be detected easily and early.

(4) The steering angle neutral point MA0 is updated so that the deviation ΔYR between the first standard yaw rate $YR_{std}1$ and the actual yaw rate $YR_{sen}$ is closer to "0". Thus, the relationship between the first standard yaw rate $YR_{std}1$ and the actual yaw rate $YR_{sen}$ is adjusted appropriately to smooth out the variations present in the detection values from the sensors (steering angle sensor 31, vehicle speed sensor 32, yaw rate sensor 33, and lateral acceleration sensor 34) and the variations present in the vehicle specifications (total variation).

(5) Accordingly, the disturbance determination can be performed with higher accuracy. There is no need to wait until the magnitude of the disturbance increases to some extent in consideration of the variations in advance. Therefore, the disturbance can be detected earlier. As a result, the vehicle behavior stabilization control can be started earlier. Thus, the lateral movement amount of the vehicle 100 due to the disturbance can be reduced to the extent possible.

(6) Even when the total variation correction completion condition is established, the total variation correction status is returned to "incomplete" with an elapse of the set time $T_{ref}$ after the establishment, and it is determined again whether the total variation correction completion condition is established. For example, a sensor environment changes incessantly. Depending on sensors, detection characteristics (for example, temperature characteristics) change due to the change in the environment. By providing the time limit for the total variation correction status, highly accurate disturbance determination can be executed with higher reliability.

(7) When the vehicle behavior stabilization control is executed, the control amount is calculated by using the first standard yaw rate $YR_{std}1$ calculated based on the arithmetic expression that includes the updated control steering angle (MA-MA0) as the calculation parameter. Thus, the vehicle behavior stabilization control can be executed with high robustness.

(8) There is possibly a method involving detecting the disturbance that causes the vehicle to veer by receiving the crosswind based on a change in a camera image obtained by capturing a region ahead of the vehicle. However, this method is undesirable because a calculation load caused by image processing increases. This embodiment attains such an effect that the calculation load is reduced as compared to this method.

Although the vehicle behavior control apparatus according to this embodiment is described above, the disclosure is not limited to the embodiment described above, and various modifications may be made without departing from the scope of the disclosure.

For example, the disclosure may be applied to a vehicle having an automatic steering function for causing the vehicle to travel along a target traveling line. The vehicle having the automatic steering function captures an image of a region ahead of the vehicle with a camera, recognizes the position of the vehicle relative to a traveling lane based on the camera image, and performs automatic steering so that the vehicle travels along the target traveling line (for example, a center line of the traveling lane). This vehicle can detect a deviation of the position of the vehicle in the lateral direction, and correct the lateral position of the vehicle. However, the calculation load is high. Therefore, it is difficult to respond to a sudden crosswind disturbance. Thus, there is a demand to detect the disturbance early so that the position of the vehicle does not deviate significantly in the lateral direction due to the sudden crosswind disturbance. This embodiment can meet such a demand.

In this embodiment, the determination result of the disturbance detection unit 21 is transmitted to the behavior control unit 22 and used for the vehicle behavior stabilization control using the braking forces. In place of or in addition to this configuration, the determination result may be used for vehicle behavior stabilization control using steering control. For example, the determination result of the disturbance detection unit 21 may be transmitted to the electric power steering system 52, and the electric power steering system 52 may control steering of the steered wheels to control the veer of the vehicle 100.

The embodiment of the disclosure is summarized as follows. The disturbance detection unit 21 determines that the disturbance occurs in the vehicle when the disturbance determination condition is established. The disturbance determination condition defines the relationship among the first standard yaw rate ($YR_{std}1$) calculated by using the vehicle speed, the steering angle, the lateral acceleration, and the vehicle specifications, the second standard yaw rate ($YR_{std}2$) calculated by using the vehicle speed, the steering angle, and the vehicle specifications, and the actual yaw rate ($YR_{sen}$) detected by the yaw rate sensor. The disturbance determination condition includes a cant traveling exclusion condition that is not established when the vehicle veers by traveling along the cant road but is established when the vehicle veers by receiving the crosswind.

What is claimed is:
1. A vehicle disturbance detection apparatus, comprising:
a sensor device including
a vehicle speed sensor configured to detect a vehicle speed,
a steering angle sensor configured to detect a steering angle, a lateral acceleration sensor configured to detect a lateral acceleration of a vehicle, and a yaw rate sensor configured to detect a yaw rate of the vehicle; and an electronic control unit configured to execute determining whether a disturbance occurs in the vehicle based on detection signals from the sensor device, the disturbance being a lateral external force that causes the vehicle to veer in a direction different from a direction expected by a driver, calculating a first standard yaw rate estimable by using pieces of information related to the vehicle speed, the steering angle, the lateral acceleration, and predetermined vehicle specifications, calculating a second standard yaw rate estimable by using the pieces of information related to the vehicle speed, the steering angle, and the vehicle specifications without using the piece of information related to the lateral acceleration, and determining that the disturbance occurs in the vehicle when a disturbance determination condition is established in a relationship among the first standard yaw rate, the second standard yaw rate, and an actual yaw rate, the disturbance determination condition including a cant traveling exclusion condition that is not established when the vehicle veers by traveling along a cant road but is established when the vehicle veers by receiving a crosswind, the actual yaw rate being the yaw rate detected by the yaw rate sensor.

2. The vehicle disturbance detection apparatus according to claim 1, wherein the cant traveling exclusion condition includes a condition that defines a relationship in which a sign of a value obtained by subtracting the second standard yaw rate from the first standard yaw rate differs from a sign of a value obtained by subtracting the second standard yaw rate from the actual yaw rate.

3. The vehicle disturbance detection apparatus according to claim 2, wherein the disturbance determination condition includes a condition that a deviation between the first standard yaw rate and the second standard yaw rate is larger than a first threshold and a deviation between the actual yaw rate and the second standard yaw rate is larger than a second threshold.

4. The vehicle disturbance detection apparatus according to claim 2, wherein the disturbance determination condition includes a condition that a deviation between the actual yaw rate and the first standard yaw rate is larger than a third threshold.

5. The vehicle disturbance detection apparatus according to claim 1, wherein the electronic control unit is configured to use a neutral point relative steering angle as the piece of information related to the steering angle when calculating the first standard yaw rate and when calculating the second standard yaw rate, the neutral point relative steering angle being an angle obtained by converting the steering angle detected by the steering angle sensor into a relative angle to a steering angle neutral point, the electronic control unit is configured to detect a situation in which the vehicle is traveling straightforward, and the electronic control unit is configured to correct, when the electronic control unit detects that the vehicle is traveling straightforward, the steering angle neutral point so that a deviation between the calculated first standard yaw rate and the actual yaw rate detected by the yaw rate sensor decreases.

6. The vehicle disturbance detection apparatus according to claim 5, wherein the electronic control unit is configured to determine that correction of variations in the sensor device and in the vehicle specifications is completed when the deviation between the first standard yaw rate and the actual yaw rate is equal to or smaller than a correction completion determination threshold through correction of the steering angle neutral point, and the disturbance determination condition includes a condition that determination is made that the correction of the variations is completed.

7. The vehicle disturbance detection apparatus according to claim 6, wherein the electronic control unit is configured such that, when an elapsed time after the determination is made that the correction of the variations is completed reaches a set time, the electronic control unit cancels the determination that the correction of the variations is completed, and then determines again that the correction of the variations is completed when the deviation between the first standard yaw rate and the actual yaw rate is equal to or smaller than the correction completion determination threshold through the correction of the steering angle neutral point.

* * * * *